(No Model.)
C. E. TURNOCK.
CIRCULAR SAWING MACHINE.
No. 572,230. Patented Dec. 1, 1896.
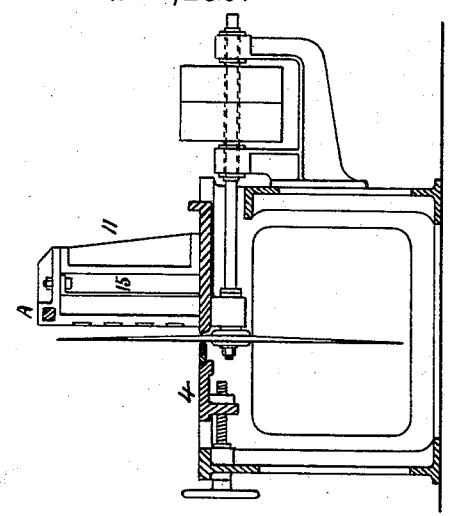
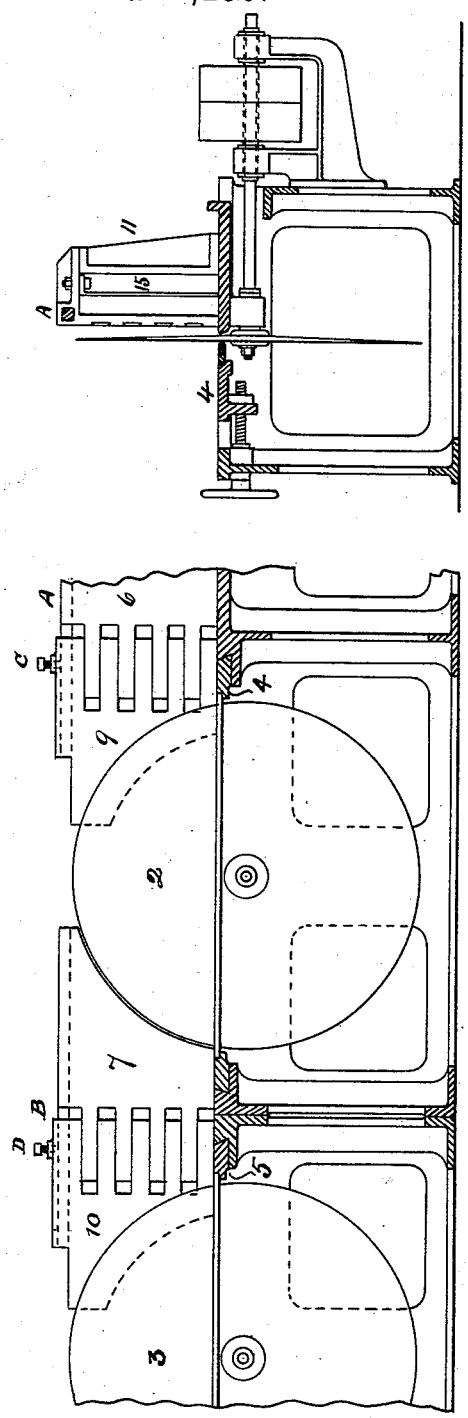
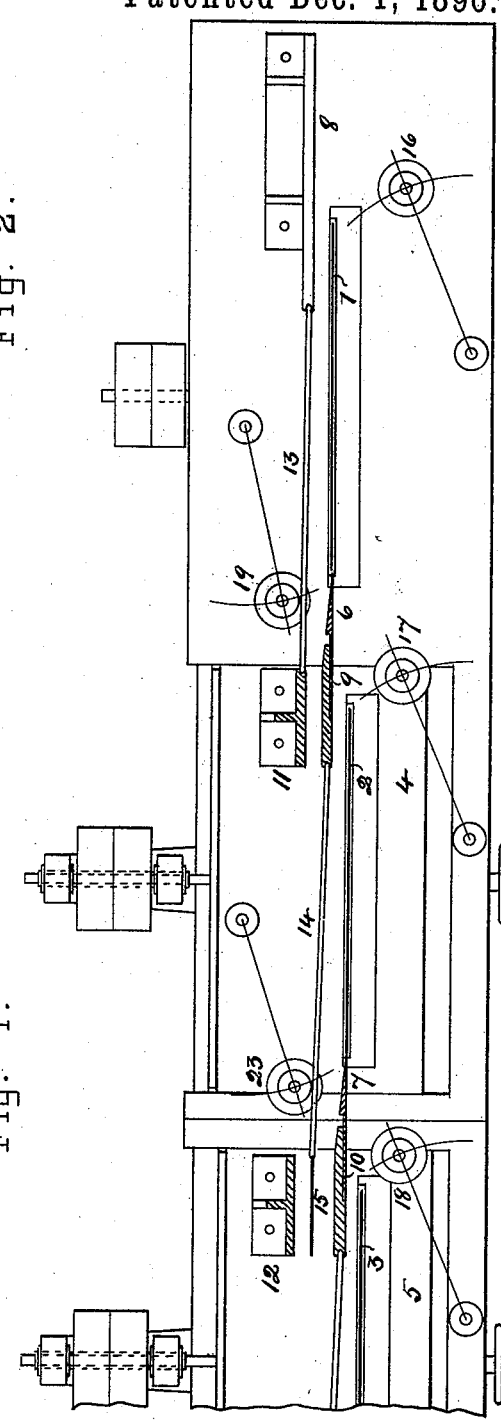
WITNESSES.
George F. Thompson
A. E. Cassell
INVENTOR.
Charles Eaton Turnock

UNITED STATES PATENT OFFICE.

CHARLES EATON TURNOCK, OF LIVERPOOL, ENGLAND.

CIRCULAR SAWING MACHINE.

SPECIFICATION forming part of Letters Patent No. 572,230, dated December 1, 1896.

Application filed March 30, 1896. Serial No. 585,427. (No model.) Patented in England September 13, 1895, No. 17,137.

*To all whom it may concern:*

Be it known that I, CHARLES EATON TURNOCK, a British subject, residing in the city of Liverpool, county of Lancaster, England, have invented certain new and useful Improvements in Machines for Sawing Wood and the Like, (for which I have applied for Letters Patent in Great Britain, No. 17,137, bearing date September 13, 1895,) of which the following is a specification.

My invention relates to certain improvements in and connected with circular-saw machines employing two or more saws used for cutting timber into boards of various thicknesses and for like purposes; and the object of my said invention is more especially to enable the use of "swage-saws" in the cutting of two or more boards simultaneously by the provision and combination therewith of such fences, kerf-spreaders, and guides as will insure their successful working; but my said invention is equally applicable in the case of ordinary circular saws.

Hitherto with the use of swage-saws (*i.e.*, circular saws made thicker in the middle to give stiffness to a thin cutting edge) it has not been the practice to cut more than one board at one time, owing to the fact that much difficulty has been experienced in dealing with the cut boards, which must be guided away from the saws at a considerable angle.

The figures upon the sheet of drawings hereunto appended represent substantially the features of my said invention as embodied in a machine designed to accomplish the objects named.

Figures I, II, and III are a longitudinal sectional elevation, a transverse section, and a plan, respectively, of a machine designed to cut three boards simultaneously; but a larger number of saws may be employed in the order shown.

1, 2, and 3 are three circular swage-saws. 1, the first in the series, is carried in the usual manner. Saws 2 and 3, and others following, if more are employed, are carried by sliding top plates or frames, such as 4 and 5, which form the surface of the machine top or table at the points where the saws are located. These said plates or frames are designed to slide transversely for enabling the adjustment of the saws to cut boards of various thicknesses.

Adjoining each saw an adjustable guide or fence is provided. The fence 8 is of ordinary character, but fences 9 10 and others adjoining succeeding saws are of a special character and consist of front plates of cast-iron or other suitable material attached to brackets or stays 11 12, spaces being formed between same for the passing through of the boards cut by the preceding saw or saws. Within the space behind fence 10 and others following is placed one or more thin vertical plates, such as 15, for the purpose of keeping separate the boards cut by preceding saws.

Immediately following the first and each succeeding saw vertical plates, such as 6 7, are placed and arranged to stand in and open the cuts formed by the saws. These plates, which are of steel or other suitable material, are of tapering section, shaped to follow the curve of the saws, and are connected to the fences 9 10 by means of a number of dovetailed tongues fitting into corresponding grooves in the faces of such fences, the object being to enable the same to be adjusted longitudinally to suit saws of different diameters while at all times maintaining the continuity and evenness of the surfaces of the said plates and fences against which the timber being cut is pressed by the feed-rollers. These plates or kerf-spreaders are further stayed to the fences by means of stout bars A B, fitting and sliding in sockets formed on the tops of the fence-plates. Set-screws C D are provided for setting and securing the plates in the desired position. Each fence is connected by means of plates, such as 13 14, to either the bracket supporting the next succeeding fence or to the vertical plate located in the space behind such fence. These plates are slotted near their ends to allow of the collars formed on the feed-rollers 19 to 23 to project through for the purpose of propelling forward the cut boards.

Feed-rollers 16 to 18 are provided in front of the saws to propel the timber to the saws. These are of the usual character.

I am aware that circular saws and spindles capable of lateral adjustment have been employed to cut two or more boards simultaneously, and I therefore wish it to be understood that I do not claim the combination of two or more saws in one frame or machine, nor the method of transverse adjustment; but, to the best of my knowledge and belief, the arrangement of a number of saws, some or all of them being adjustable transversely, and the combination therewith of plates, such as 6 7, and fences, such as 9 10, designed to enable the use of swage as well as ordinary circular saws, as herein shown and described, is novel, and I therefore claim as my invention and desire to secure by Letters Patent of the United States—

1. In circular-saw machines employing two or more saws in the order herein described, the combination with the fences adjoining the second and succeeding saws, of plates such as 6, 7, attached thereto by a number of dovetailed tongues fitting into corresponding grooves in the faces of such fences, substantially as herein shown and described and for the purpose stated.

2. The combination with the second and each succeeding saw of fences such as 9, 10, and the combination therewith of brackets such as 11, 12, and plates such as 15, substantially as herein shown and described and for the purpose stated.

In witness whereof I have hereunto signed my name in the presence of two subscribing witnesses.

CHAS. EATON TURNOCK.

Witnesses:
 GEO. F. THOMPSON,
 EDWARD CAIN.